United States Patent [19]

Kearns et al.

[11] Patent Number: 5,087,820

[45] Date of Patent: Feb. 11, 1992

[54] RADIOMETRIC ANALYSIS SYSTEM FOR SOLID SUPPORT SAMPLES

[75] Inventors: Edward G. Kearns, North Haven, Conn.; Norbert Roessler, Naperville, Ill.; Gustaaf van Cauter, Middetown; Kreso Ukraincik, Cromwell, both of Conn.

[73] Assignee: Digital Diagnostic Corp., Hamden, Conn.

[21] Appl. No.: 359,203

[22] Filed: May 31, 1989

[51] Int. Cl.$^5$ .............................................. G01T 1/185
[52] U.S. Cl. .................................. 250/385.1; 250/328; 250/374
[58] Field of Search .................... 250/374, 379, 385.1, 250/328

[56] References Cited

U.S. PATENT DOCUMENTS

| | | | |
|---|---|---|---|
| 3,418,474 | 11/1965 | Spergel et al. | 250/385.1 |
| 3,665,189 | 5/1972 | Maillot | 250/83.6 R |
| 3,911,279 | 10/1975 | Gilland et al. | 250/385 |
| 4,245,042 | 1/1981 | Weinstein et al. | 435/30 |
| 4,260,892 | 4/1981 | Kovacs et al. | 250/388 |
| 4,360,755 | 11/1982 | Levy | 313/93 |
| 4,392,057 | 7/1983 | Mathieson et al. | 250/385 |
| 4,431,921 | 2/1984 | Filthuth | 250/374 |
| 4,453,076 | 6/1984 | Jackson | 250/374 |
| 4,596,933 | 6/1986 | Waechter et al. | 250/388 |
| 4,617,680 | 10/1986 | Johnston | 377/10 |
| 4,631,411 | 12/1986 | Noback | 250/374 |
| 4,670,656 | 6/1987 | Boron | 250/374 |
| 4,672,544 | 6/1987 | Chizallet et al. | 364/414 |
| 4,684,806 | 8/1987 | Mitrofanov | 250/374 |
| 4,700,067 | 10/1987 | Carossi et al. | 250/380 |
| 4,721,857 | 1/1988 | Kronenberg | 250/374 |

OTHER PUBLICATIONS

Inotech, "Automatic Sample Processing and Filter Counting System INB-384", (eight pages).
Digital Diagnostic Corporation, "Vanguard Model 2001 Radiochromatogram Scanner", (two pages).

*Primary Examiner*—Carolyn E. Fields
*Assistant Examiner*—Drew A. Dunn
*Attorney, Agent, or Firm*—Arnold, White & Durkee

[57] ABSTRACT

For simultaneously measuring the radioactivity of multiple samples arranged in a predetermined array of x rows and y columns, a fixed array of radiation counters arranged in the same array of x rows and y columns so that one of the counters is aligned with each of the multiple samples. Each of the counters has a pair of spaced electrodes; an electrical voltage source connected to the electrodes of all the counters for applying the same voltage across the electrodes of each of the radiation counters in the array; and sensing means connected to the electrodes of each of the radiation counters for independently detecting pulses of electrical current produced by ionization of the gas between the respective pairs of electrodes of each of the radiation counters. For measuring low-energy radiation, the radiation counters are windowless, a flow of ionizable gas is supplied to the counters, and the same flow rate of the ionizable gas is maintained through each of the radiation counters in the array. Preferably the radiation counters are formed in a metal plate that provides shielding to minimize "cross talk" between adjacent samples.

17 Claims, 11 Drawing Sheets

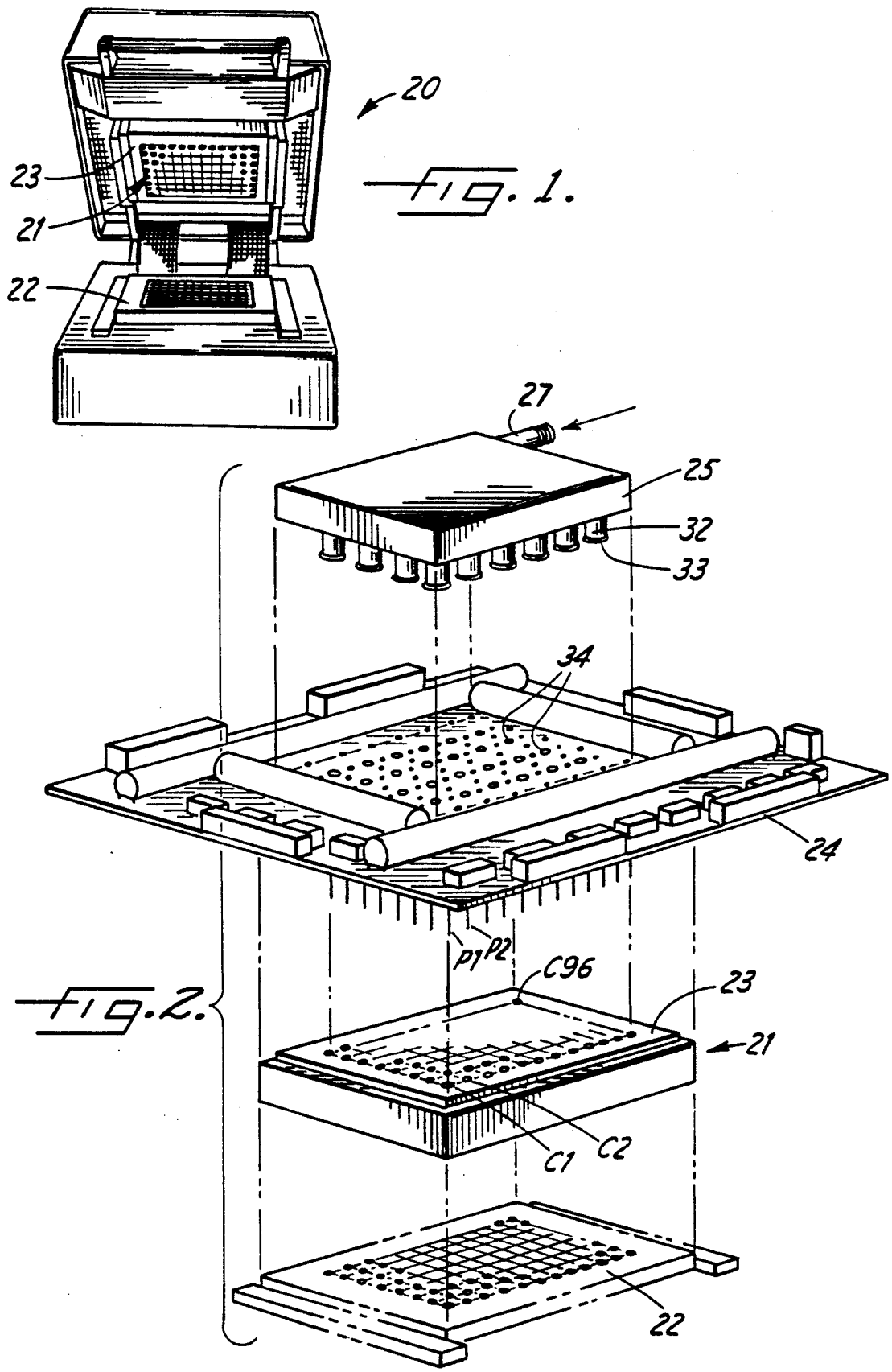

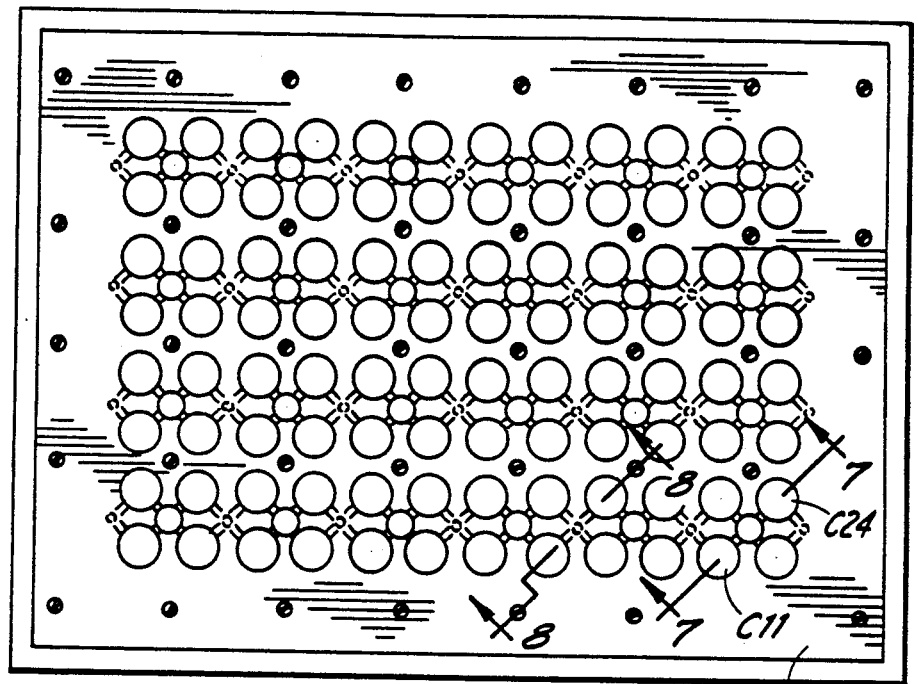
_fig.5._
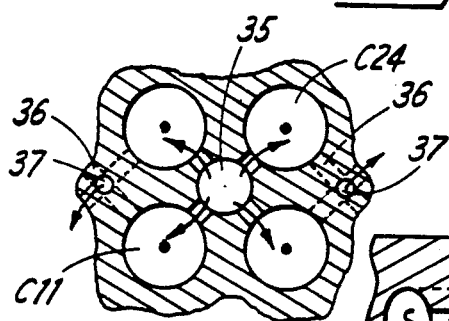
_fig.6._
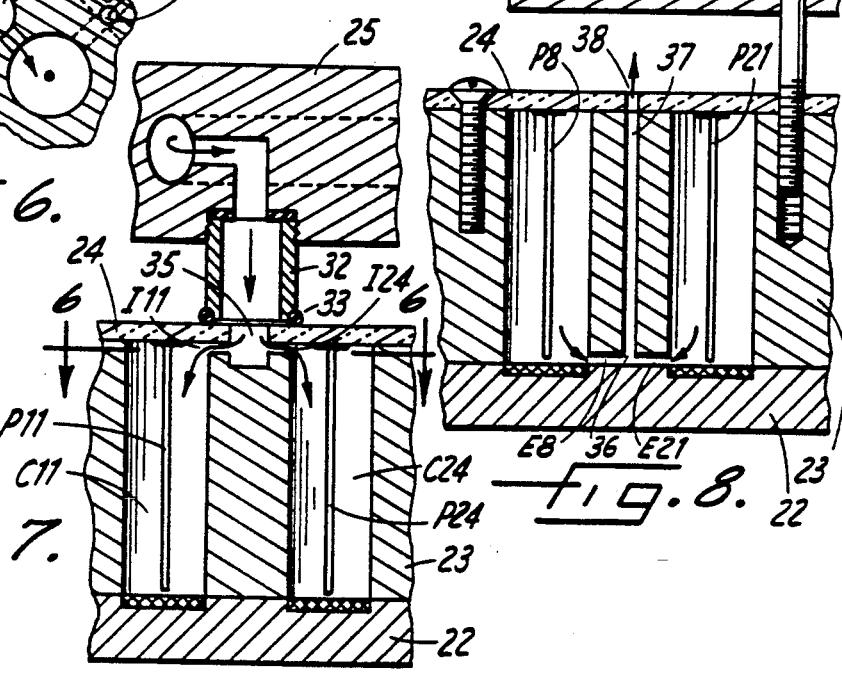
_fig.7._
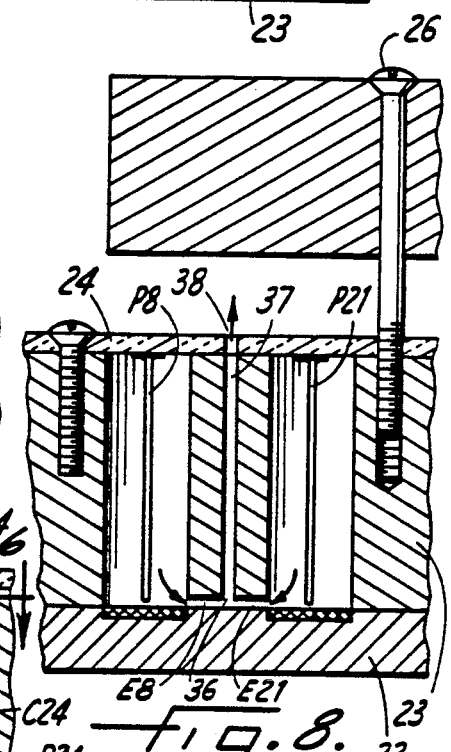
_fig.8._

RADIOMETRIC ANALYSIS SYSTEM FOR SOLID SUPPORT SAMPLES

BACKGROUND OF THE INVENTION

The present invention relates generally to radiometric analysis systems and, more particularly, to a system using an array of radiation counters for measuring the radioactivity of a corresponding array of radioactive samples deposited on a solid support.

SUMMARY OF THE INVENTION

A primary object of this invention is to provide an improved radiometric analysis system which can be used to measure the radioactivity of samples deposited on the surface of a solid support such as a MICROTITER ® plate, or directly on the filter media used in cell harvesting, dot hybridization and immunoblotting.

Another important object of this invention to provide an improved radiometric analysis system which minimizes counting errors due to "cross talk" between adjacent samples, even when the samples are closely spaced as in a conventional 96-well MICROTITER ® plate.

Another object of this invention is to provide an improved radiometric analysis system which does not require a moving scanner to measure an array of rows and columns of samples on a solid support thereby eliminating the problems associated with such scanners.

A further object of the invention is to provide an improved radiometric analysis system which eliminates handling steps between the harvesting of the cells and the measurement of the radiation level of the cells.

A still further object of the invention is to provide an improved radiometric analysis system which minimizes the volume of radioactive waste to be disposed of.

In accordance with an important aspect of the present invention, the foregoing objectives are realized by providing apparatus for simultaneously measuring the radioactivity of multiple samples arranged in a predetermined array of x rows and y columns, the apparatus comprising a fixed array of radiation counters arranged in the same array of x rows and y columns as the multiple samples so that one of the counters is aligned with each of the multiple samples, each of said counters having a pair of spaced electrodes and inlet and exit means for passing an ionizable gas through the space between the electrodes; an electrical voltage source connected to the electrodes of all the counters for applying the same voltage across the electrodes of each of the radiation counters in the array; means for maintaining the same flow rate of the ionizable gas through each of the radiation counters in the array; and sensing means connected to the electrodes of each of the radiation counters for independently detecting pulses of electrical current produced by ionization of the gas flowing between the respective pairs of electrodes of each of the radiation counters.

BRIEF DESCRIPTION OF THE DRAWINGS

Other objects and advantages of the invention will become apparent upon reading the following detailed description and upon reference to the drawings in which:

FIG. 1 is a perspective view of a radiometric analysis instrument embodying the present invention;

FIG. 2 is an enlarged, exploded perspective view of the internal structure of the instrument shown in FIG. 1;

FIG. 5 is an enlarged section taken generally along line 5—5 in FIG. 4;

FIG. 6 is a further enlarged section taken generally along line 6—6 in FIG. 7;

FIG. 7 is an enlarged fragmentary section taken generally along line 7—7 in FIG. 5;

FIG. 8 is an enlarged fragmentary section taken generally along line 8—8 in FIG. 5;

Figure 3:
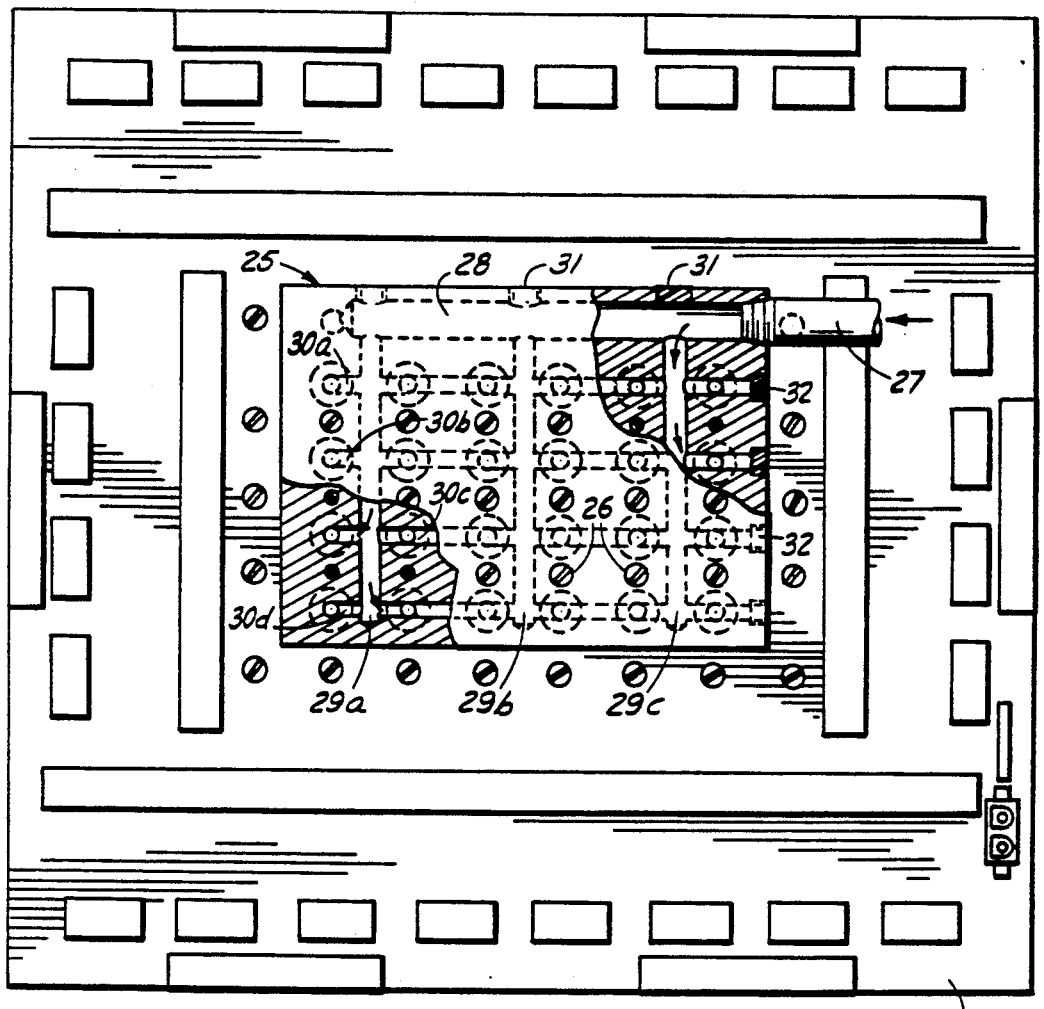
FIG. 3 is an enlarged top plan view of the apparatus shown in FIG. 2.
Figure 4:
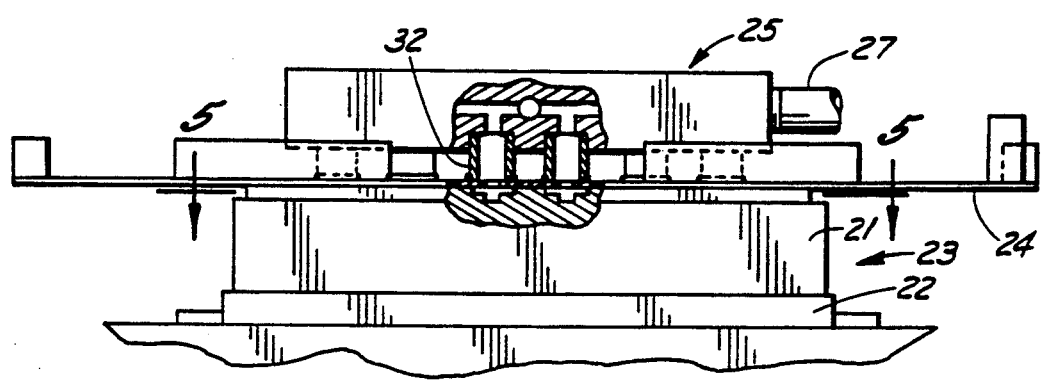
FIG. 4 is an end elevation view of the apparatus shown in FIG. 3, with a portion thereof broken away to more clearly show the internal structure.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings and referring first to FIG. 1, there is shown a radiometric analysis instrument 20 in its open position. This instrument contains a radiation measurement head 21 having fixed array or matrix of windowless Geiger-Mueller counters for directly measuring the radioactivity of a similar array of cell cultures on a carrier plate 22. The carrier plate 22 may be (1) a culture plate such as a microtiter plate in which cells are cultured, (2) a plate designed to carry a filter mat containing a matrix of multiple samples from any of a number of commercially available filter manifolds in the microplate format or (3) a removable filter-carrier plate of the type provided in certain commercially available cell harvesters, such as the Inotech "Automatic Sample Processing And Filter Counting System INB-384".

The removable filter-carrier plate 22, which is what is shown in FIGS. 1 and 2, has the advantage that each individual cell culture or sample is contained on its own separate disc of filter media. These multiple discs of filter media are not connected to each other, thereby reducing or eliminating the possibility of "cross talk" between samples due to migration of sample material through interconnecting filter media. As already indicated, however, the instrument of the present invention is not limited to the counting of samples contained on such a removable filter-carrier plate, but can also be used to count multiple samples arranged in a fixed array in a culture plate or on a single sheet of filter media such as that produced by many conventional cell filtration manifolds or harvesters which are commercially available.

The particular system illustrated in the drawings is especially adapted for the counting of samples cultured in, or harvested from, a 96-well MICROTITER ® plate. Thus, as can be seen in FIG. 2, the filter-carrier plate 22 contains eight rows of twelve samples, for a total of ninety-six samples. This is, of course, the same matrix of samples provided by a standard 96-well MICROTITER ® plate. Of course, other sample arrays of different sizes may also be used in the system of the present invention. For example, U.S. Pat. No. 4,245,042 to Weinstein et al. describes a cell harvesting device which produces a matrix of two rows of twelve samples each, for a total of twenty-four samples.

As is well known to those familiar with this art, cell harvesting is normally accomplished by aspirating the sample out of each well of the culture plate through a filter mat and then introducing a washing solution to wash each sample deposited on the filter mat. The solid portion of each sample, which includes the cultured cells, is retained on the filter mat and can then be analyzed to determine its radioactivity level or any other desired characteristics.

Following the cell harvesting operation, the samples are held on the filter mat in 96 areas or spots corresponding to the locations of the 96 wells in the MICROTITER ® plate. In the instrument illustrated in FIGS. 1-8, that filter mat is placed beneath the radiation measurement head 21 which includes a metal plate 23 containing 96 cavities C1-C96 located to register with the 96 sample-containing areas on the filter mat. A small Geiger counter is formed within each of the 96 cavities C1-C96 so that when the filter mat and the plate 23 are brought into engagement with each other, the radioactivity of all 96 samples can be simultaneously, but separately, measured.

A Geiger counter typically comprises a pair of spaced electrodes in a counting chamber, containing an ionizable gas, an electrical voltage source for applying a known electrical potential across the electrodes, and electronic sensing means connected to the electrodes for detecting and counting electrical pulses produced by ionization of the gas in the counting chamber when exposed to the radiation to be measured. The number of pulses counted in a given unit of time provides an indication of the magnitude of the radioactivity being measured.

In the illustrative embodiment of FIGS. 1-8, the metal side walls of each cavity C1-C96 form one of the electrodes for the Geiger counter formed in that cavity. Because all the cavities are formed in the single metal plate 23, the electrodes formed by the side walls of all the cavities C1-C96 can be easily maintained at the same potential, for example, by merely grounding the metal plate 23. Although there is some resistive loss introduced by the metal plate, this loss is negligible because of the high conductivity and small overall size of the plate. Because the walls of all 96 cavities are at substantially the same potential, uniform measurements can be obtained from all 96 Geiger counters, and those measurements can be reliably compared with each other.

Extending into the upper end of each cavity C1-C96 is one of 96 conductive metal pins P1-96 depending from a printed circuit (PC) board 24. These pins P1-P96 form the second electrodes for the Geiger counters formed in the respective cavities C1-C96. The lower end of each pin P1-P96 terminates at a distance d from the plane of the open lower end of the corresponding cavity, i.e., from the plane of the lower surface of the plate 21. This distance d is preferably equal to the radius r of the cavity. The pins P1-P96 are also preferably aligned with the respective longitudinal axes of the respective cylindrical cavities C1-C96. Thus, the tip of each pin is equidistant from the side walls and the lower end of its cavity.

The pins, for example, are 0.018 inches in diameter, and the radius of the cavity is 0.1325 inches. The pins preferably are made of stainless steel for stiffness and are gold plated to be inert and to facilitate soldering to the printed circuit board. In particular the upper end of each of the pins P1-P96 is affixed to the PC board 24. The attachment of each pin to the PC board is made rigid so that the pin remains positioned on the axis of its cavity.

Ionizable gas enters the cavities C1-C96 through respective inlet ports I1-I96 and exits through respective outlet ports E1-E96, which are further described below in connection with FIGS. 6, 7 and 8. A number of different ionizable "Geiger" gases are well known for use in Geiger counters. In most applications of the present invention the radiation to be detected is alpha or beta radiation, and thus it is preferred to use a low-density ionizable gas such as helium to facilitate penetration of the radiation into the region between the two electrodes of each Geiger counter. Preferably, helium is used with the addition of 1.3% butane to facilitate "quenching" of ionization and thereby increase the maximum rate at which the Geiger counters can count radiation events.

To supply ionizable gas to the inlet ports I1-I96, a gas manifold plate 25 is located above the PC board 24 and attached to the plate 25 by multiple screws 26 (see FIGS. 3 and 8). Pressurized gas is supplied to the manifold plate 25 through an inlet nozzle 27 which leads into a primary distribution passageway 28 inside the plate 25. From the passageway 28, the gas passes through three secondary passageways 29a, 29b and 29c leading to 24 L-shaped tertiary passageways formed by bores 30a, 30b, 30c, and 30d perpendicular to the secondary passageways. The bores 29, 30 forming the secondary and tertiary passageways are made by drilling from the sides of the manifold plate 25 and sealing the entrance regions with force-fitted plastic plugs 31 and 32, respectively. Preferably the plugs are made of DELRIN TM plastic. Attached to the bottom of the manifold plate 25 are 24 depending stub nozzles 32a through 32x, each of which receives gas from one of the tertiary passageways 30a through 30x. The lower end of each of the nozzles 32a–32x is fitted with a gasket ring 33 so that when the manifold plate 25 is fastened to the plate 23, the gasket rings 33 are pressed firmly against the top surface of the PC board 24 to form seals around 24 holes 34 in the PC board.

As shown most clearly in FIGS. 6 and 7, gas discharged from the manifold plate 25 through the stub nozzles 32 passes through the PC board 24 via the holes 34 and into mating recesses 35 in the top surface of the counter plate 23. Each of the 24 recesses 35 has four lateral extensions which form the gas inlet ports I1–I96 for the 96 cavities C1–C96. Thus, the gas flows laterally from the recesses 35 into the cavities C1–C96, and then downwardly through the 96 cavities between the 96 electrode pairs formed by the pins P1–P96 and the cavity side walls. At the bottom of each cavity, the gas flows laterally through one of the exit ports E1–E96 formed by recesses 36 in the lower surface of the plate 21, as can be seen in FIGS. 5, 6 and 8. Multiple exhaust holes 37 receive the gas from the recesses 36 and conduct the gas upwardly through mating holes 38 in the PC board 24. As illustrated in FIG. 8, the exhausted gas is dissipated to the atmosphere in the space between the PC board 24 and the manifold plate 25.

The gas distribution system described above produces uniform gas flow rates through the 96 Geiger counters, so that the measurements obtained from the 96 counters can be reliably compared with each other.

As is conventional in Geiger counters, a constant electrical voltage is applied across the two electrodes of each counter to facilitate ionization of the gas by any radiation entering the chamber. This applied voltage is slightly below the breakdown potential at which the gas ionizes. Then when radiation penetrates the counting cavity between the two electrodes, the gas is readily ionized. Each radiation event produces a short pulse of electrical current which can be detected by sensing circuitry connected to the electrodes of the respective counters. The number of pulses detected per unit time in any given counter provides a measurement of the radiation emanating from the sample at the aperture of that particular counter.

Figure 9:
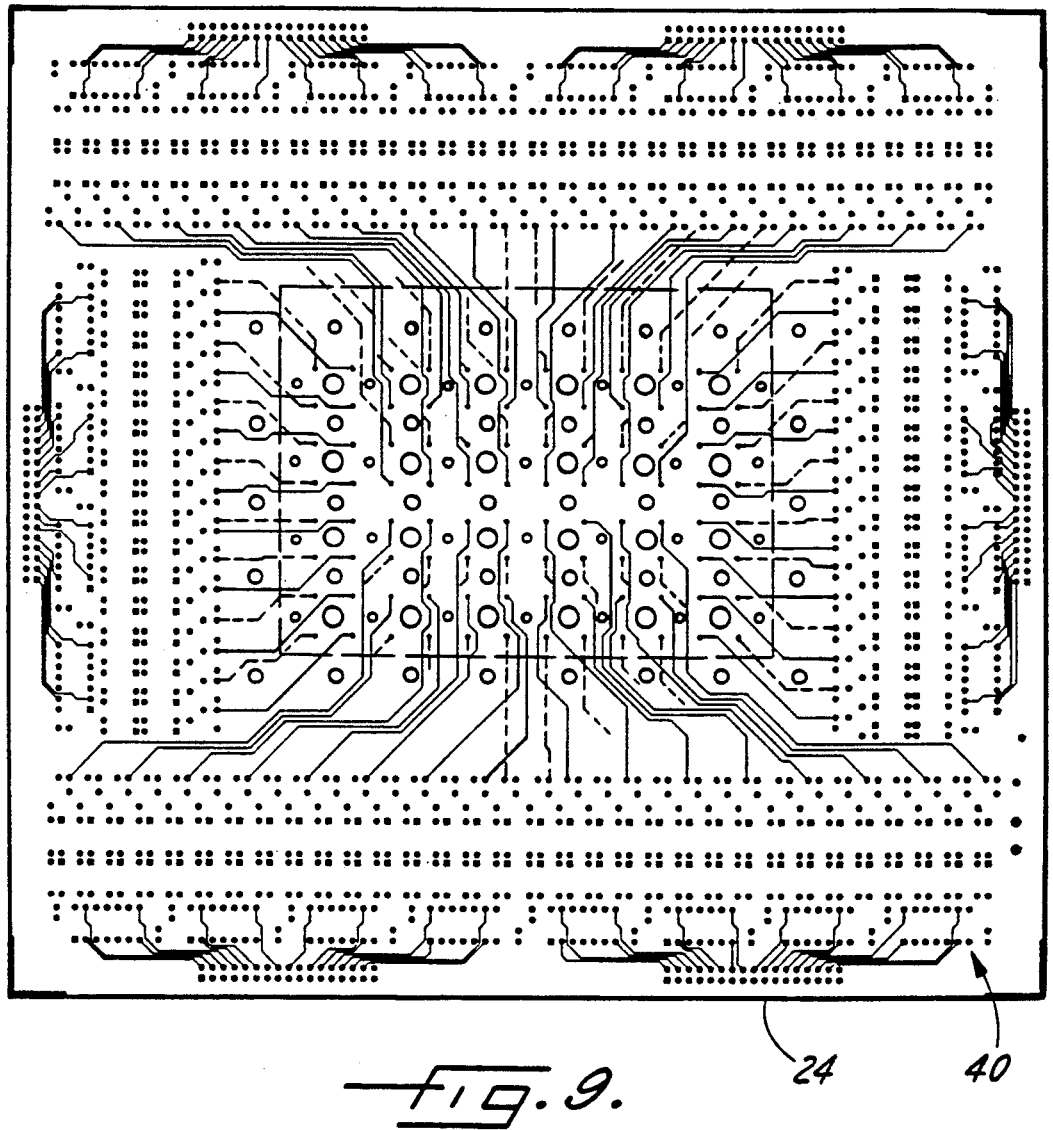
FIG. 9 is a top plan view of the layout of the printed circuit board included in the apparatus of FIGS. 1 through 8.

The circuitry for detecting the electrical pulses from each of the 96 counters is illustrated in FIG. 9, which shows a portion of the layout of the PC board 24. The board 24 includes two layers of conductive strips, illustrated respectively by the solid and broken lines in FIG. 9, which are secured to opposite sides of the board. These strips provide separate connections for each of the 96 pins P1–P96 to pulse detection circuitry 40.

Figure 10:
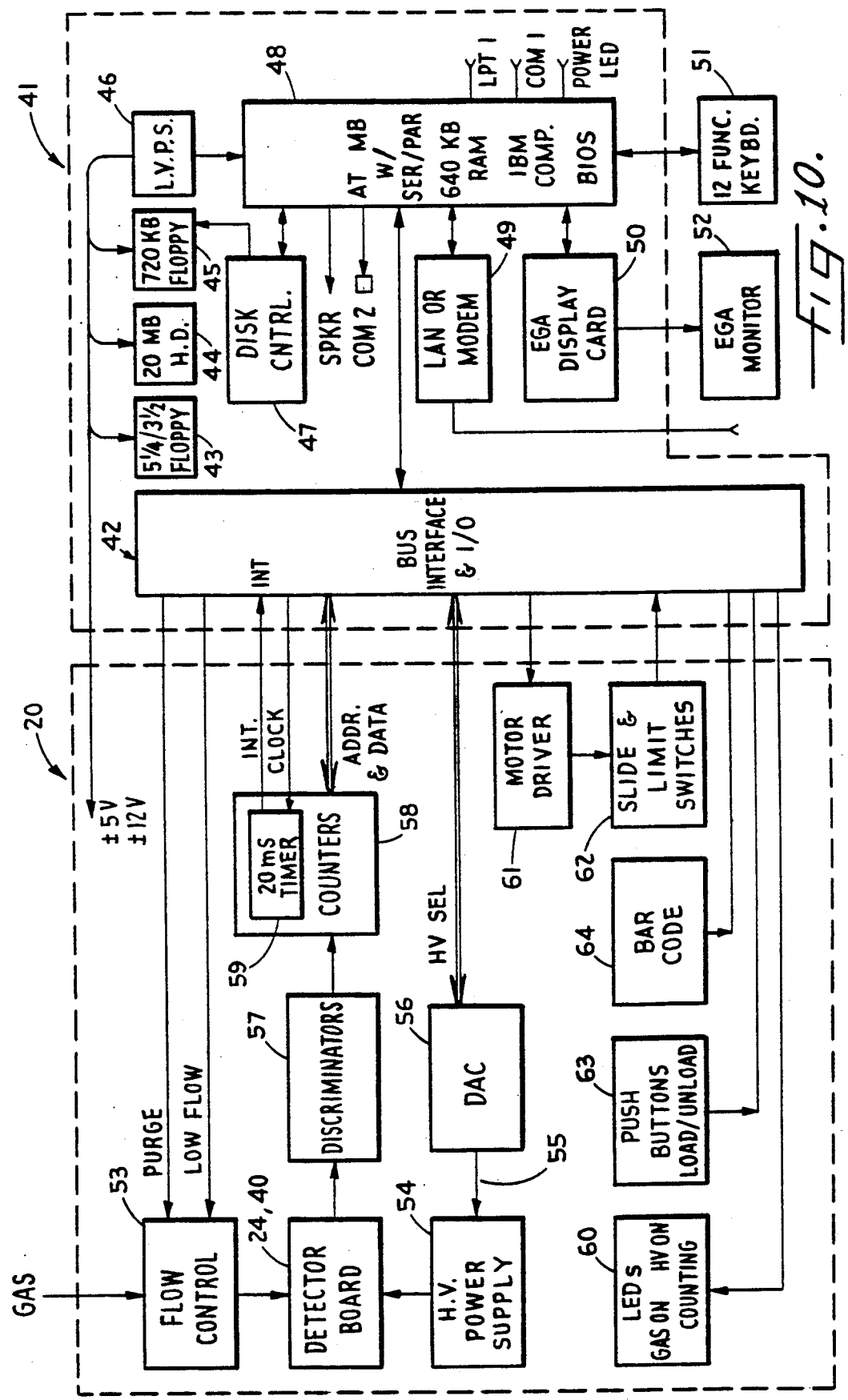
FIG. 10 is a block diagram of the preferred electrical circuits for the radiometric analysis instrument embodying the present invention.

Turning now to FIG. 10 there is shown a block diagram of the preferred electrical circuits in the radiometric analysis instrument 20. Also shown in FIG. 10 are electrical components in an IBM compatible microcomputer 41 into which is installed a bus interface 42 which interfaces the microcomputer 41 to the circuits in the radiometric analysis instrument 20. The microcomputer 41, for example, further includes a 5¼ or 3½ inch floppy disk drive 43, a 20 megabyte Winchester or hard disk drive 44, a 720 kilobyte floppy disk drive 45, a low voltage power supply 46, a disk control unit 47, and an AT MB version IBM compatible processor with a serial and parallel interface and 640 kilobytes of random access memory, a local area network interface or modem 49, and an EGA extended graphics display card 50. External to the microcomputer 41 are a twelve function keyboard 51 and an EGA monitor or display 52.

To control the flow of gas through the Geiger counters, the microcomputer may select either a high flow rate for purging the Geiger counters just after the installation of a carrier plate, or a low flow rate used to conserve gas consumption after the Geiger counters have been purged. For this purpose the bus interface 42 supplies a single-bit PURGE signal and a single-bit LOW FLOW signal to a flow controller 53 that includes, for example, a pair of solenoid valves which can be opened to provide either a high or low flow rate of gas into the inlet (27 in FIG. 2) of the gas distribution manifold (25 in FIG. 2).

The microcomputer may also select a particular value for the high voltage applied to the Geiger counters. To control the voltage, there is provided a high voltage supply 54 receiving an analog control voltage on a line 55 from a digital to analog converter 56. The digital to analog converter, for example, receives an 8-bit HV SEL signal to select from about 0 to 1,280 volts in 5 volt steps.

When the proper high voltage is applied to the Geiger counters, a radiation event causes a discharge detected as a negative-going pulse having a duration on the order of a few microseconds. The detector board 24 includes circuits 40 which convert this pulse into a pulse of relatively low and constant amplitude. Pulses from all of the detectors are applied to respective discriminators 57 which insure that all of the pulses above a predetermined threshold are converted to pulses having a fast rise time sufficient to clock respective counters 58. For each Geiger counter, there is provided a respective 16-bit binary counter that is addressable by the microcomputer through the bus interface 42. To prevent the 16-bit counters from overflowing, the counts accumulated in the counters are transferred to the random access memory in the processing unit 48 of the microcomputer 41. To insure that counts will be registered in the counters 58 only during a preselected counting interval, the counters 58 include a counter 59 functioning as a programmable timer, and the counter 59 is enabled to count a clock signal from the microcomputer 41 whenever the other counters 58 are enabled for counting radiation events detected by the Geiger counters. The counter 59, for example, is loaded with a number proportional to the duration of the counting interval, and the counter 59 counts down at 20 millisecond intervals until a count of zero is reached, whereupon a signal (INT) is sent to the microcomputer, and all of the counters 58 are thereafter inhibited from counting until the counter 59 is reloaded by the microcomputer to count during another counting interval.

The radiometric analysis instrument 20 preferably has a number of features provided for the convenience of the user. The instrument, for example, has light emitting diodes 60 for indicating whether either a purge or low flow rate of gas is turned on, the high voltage power supply is turned on, and whether radiation events detected by the Geiger counters are being counted. Another option for the instrument 20 is a motor driven slide for sliding the carrier plate 22 into registration below the radiation measurement head 21. When a motor driven slide is used, for example, the carrier plate 22 need only be introduced from the front of the instrument and the radiation measurement head 21 need only be opened as shown in FIG. 1 for inspection, cleaning or maintenance. The motor driven slide option uses a motor driver 61 for driving a motor in a slide mechanism 62 in either a forward or reverse direction to load or unload a carrier plate. The slide mechanism 62 also includes limit switches to indicate when the carrier plate is fully loaded or unloaded in order to turn the slide motor off at the required times. To turn the slide motor on, the instrument 20 includes load and unload push button switches 63.

To identify particular carrier plates or to indicate an analysis protocol to be performed for a particular carrier plate, the carrier plate may include coding means that are readable by the instrument when the carrier plate is loaded into the instrument. To read the coding means on the carrier plate, the instrument 20 includes a bar code reader 64 such as an array of phototransistors which sense light either reflected or blocked by the coding means included in the carrier plate. One convenient form of coding means, for example, is a set of thumb wheels mounted in a handle portion of the carrier plate and which can be rotated to selected positions and have perforations which selectively block the passage of light depending on the positions to which the thumb wheel are rotated.

Figure 11:
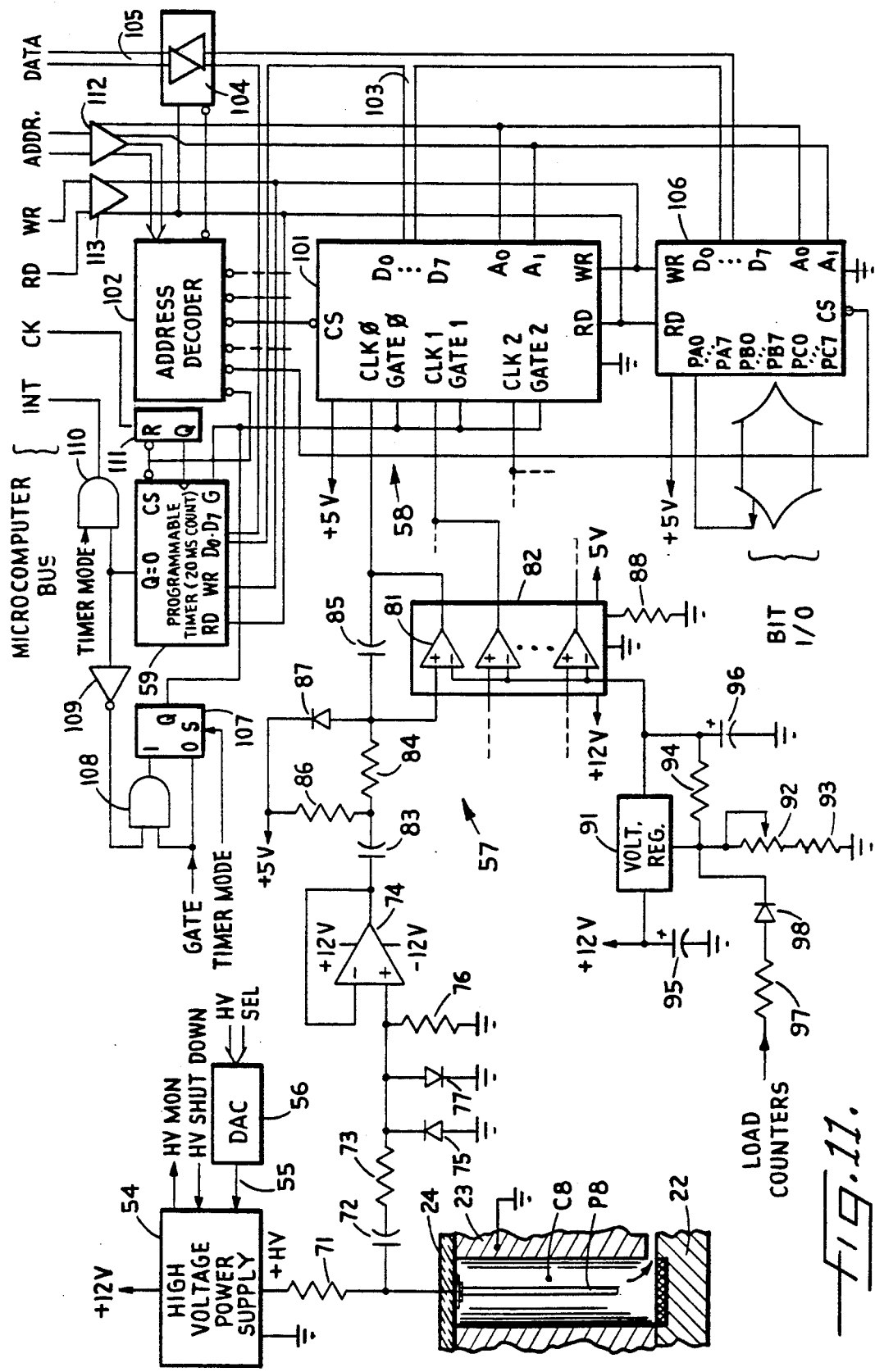
FIG. 11 is a schematic diagram showing the detector, discriminator, and counting circuits associated with single one of the 96 Geiger counters in the radiometric analysis instrument.

Turning now to FIG. 11, there is shown a schematic diagram of the circuits in the radiometric analysis instrument that are associated with a single Geiger counter formed by the chamber C8. The high voltage +HV from the high voltage power supply 54 is applied to the pin P8 forming the anode of the Geiger counter via a resistor 71 which limits the discharge current when the Geiger counter detects a radiation vent. When ionization causes the conductive path to be formed from the pin P8 to the wall of the chamber C8, a capacitor 72 discharges through a resistor 73 causing a negative voltage pulse to be applied to a follower 74. The amplitude of this negative pulse is limited by a directional diode 75. In the absence of a discharge, the voltage sensed by the follower 74 is zero volts as provided by a resistor 76 shunting the positive input of the follower to ground. The positive voltage across the resistor 74 is limited by a second directional diode 77. The values for these components are, for example, 4.7 megohms for resistor 71, 0.001 microfarads for capacitor 72, 3.6 K ohms for resistor 73, and 510 K ohms for resistor 76. The follower 74 is, for example, part no. TL084. These components are included in the circuits 40 mounted on the circuit board 24 around the periphery of the board, as indicated by the circuit patterns in FIG. 9.

Associated with each Geiger counter is a discriminator including a line receiver amplifier 81. The line receiver 81 is part of an integrated circuit 82 such as part no. LTC1045. Each integrated circuit 82 includes six separate line receiver amplifiers, and therefore 16 integrated circuits 82 in total are needed for all 96 Geiger counters in the radiometric analysis instrument 20.

Negative going pulses from the follower 74 are coupled to the line receiver amplifier 81 through a capacitor 83 and a resistor 84. A capacitor 85 provides positive feedback from the amplifier 81 so that the amplifier 81 responds with a negative going pulse of predefined duration and having rapid rise and fall times so as to provide a clocking signal. The discriminator circuit, generally designated 57, further includes a resistor 86 biasing the positive input of the amplifier 81 to 5 volts, and a directional diode 87 for rapidly discharging the capacitor 85 upon the occurrence of the trailing edge of the negative going pulse from the amplifier 81. Therefore, the discriminator circuit 57 can rapidly respond to successive pulses from successive radiation events. Typical component values are, for example, 470 picofarads for capacitor 83, 10 K ohms for resistor 84, 47 picofarads for capacitor 85 and 10 K ohms for resistor 86. The current drive characteristics of the amplifier 81 are set by a resistor 88 which has a value, for example, of 10 K ohms.

The line receiver amplifiers 81 have a negative input connected to a threshold voltage provided by a voltage regulator 91. Normally this voltage regulator should provide an output of 4.9 volts to respond to negative pulses from a follower 74 having an amplitude in excess of about 100 millivolts. This threshold voltage is adjusted by a variable resistor 92 in connection with fixed resistors 93 and 94. Typical values for these resistors are, for example, 240 ohms for resistor 92, 560 ohms for resistor 93, and 240 ohms for resistor 94. To reject power supply noise, the input and output terminals of voltage regulator are shunted to ground through electrolytic capacitors 95 and 96. These electrolytic capacitors preferably have a value of 4.7 microfarads.

Due to peculiar characteristics of the counters 58, it is necessary to supply a clock pulse to initialize the counters. This clock pulse is conveniently generated by applying a 5 volt pulse to the control terminal of the voltage regulator 91 through a resistor 97 and a direction diode 98. The resistor 97, for example, has a value of 240 ohms. When such a "LOAD COUNTERS" signal is applied to the voltage regulator, the output of the voltage regulator jumps to about 5.2 volts, causing all of the line receiver amplifiers 81 to generate a negative going pulse sufficient to clock the counters 58.

Preferably the counters 58 are provided by 32 integrated circuits 101 each including three separate addressable counters. The integrated circuit 101, for example, is part no. 82C54. This part number may also be used for the timer 59. To permit the microcomputer (41 in FIG. 10) to individually address any single counter, the high order address bits are decoded by a address decoder 102 to provide a chip select signal for each of the integrated circuits 101. Each of the integrated circuits 101 also receives the two least significant address bits A0, A1 which select a particular one of the three counters in each integrated circuit. Moreover, each integrated circuit 101 receives read (RD) and write (WR) control signals to permit the microcomputer to either read out the value of the count in the selected counter, or to load the selected counter with a preselected value on a data bus 103.

Since a relatively large number of the counter chips 101 are connected to the data bus 103, there is provided a bi-directional buffer 104 between the data bus 103 and the data bus 105 of the microcomputer. The direction of the buffer 104 is controlled by the read signal (RD), and the buffer 104 is further enabled by a select signal from the address decoder 102 whenever any of the counter integrated circuits 101 are addressed.

The circuitry 20 for the radiometric analysis instrument also includes a peripheral adapter circuit 106 which is addressable by the microcomputer and provides single bit inputs and outputs. These single bit inputs and outputs, for example, include a GATE signal for enabling the counters 58 to count, the 8-bit high voltage select signal applied to the digital to analog converter 56, as well as other single bit input and output signals, such as signals for activating the light emitting diodes (60 in FIG. 10) or switch inputs such as from the push buttons (63 in FIG. 11) or limit switches (62 in FIG. 11).

As mentioned above there is a programmable timer 59 associated with the counters in order to determine the precise time intervals over which the counters 58 are enabled for counting. The circuits shown in FIG. 11 can be operated in both a timer mode and a non-timer mode, as selected by multiplexer 107. In a non-timer mode, the microcomputer may gate the counters 101 directly. In the timer mode, AND gate 108 insures that the counters 58 may count only for a preselected counting interval, when the output of the timer 51 is a logic zero as sensed by an inverter 109. Also, in the timer mode, the timer working in connection an AND gate 110 provides the signal (INT) for telling the microcomputer that the end of the selected counting interval has occurred. At that time, the microcomputer may read the final value of counts from the counters 58. To load the timer, the microcomputer addresses a particular address decoded by the address decoder causing a signal to be applied to the chip select (CS) input of the timer 59, and writes a particular value into the counter representing the duration of the desired counting interval in seconds divided by 50. The counter, in other words, counts down by one at 20 millisecond intervals from the time it is loaded, and provides an output (Q) when the counter reaches a value of zero. The one millisecond rate is provided, for example, by a counter 111 clocked by a clock signal CK from the microcomputer. Also shown in FIG. 11 are an address buffer 112 and a buffer 113 for the read and write signals.

Figure 12A:
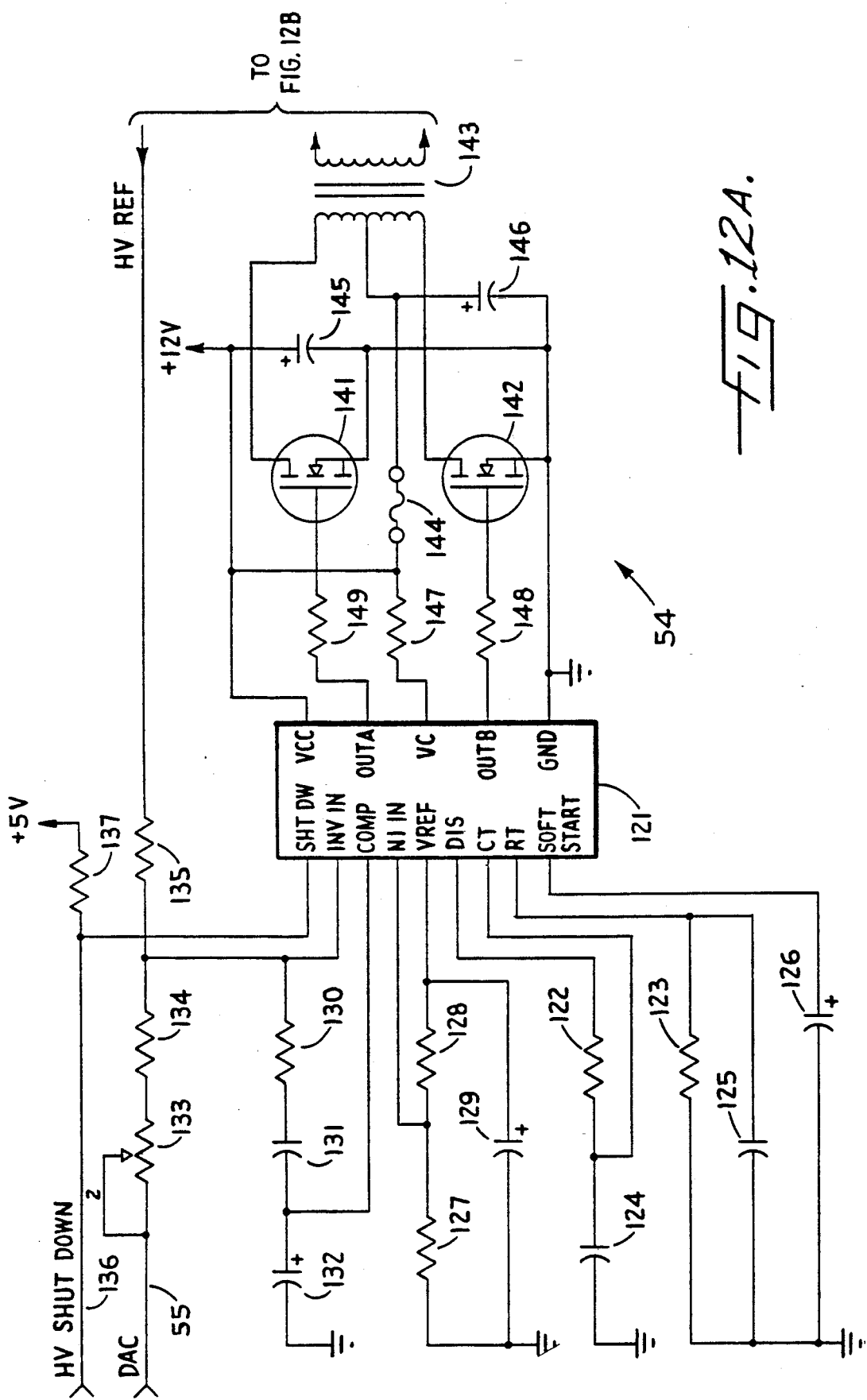
FIG. 12A and 12B together comprise a schematic diagram for the high voltage power supply which supplies high voltage to the Geiger counters for the radiometric analysis instrument.
Figure 12B:
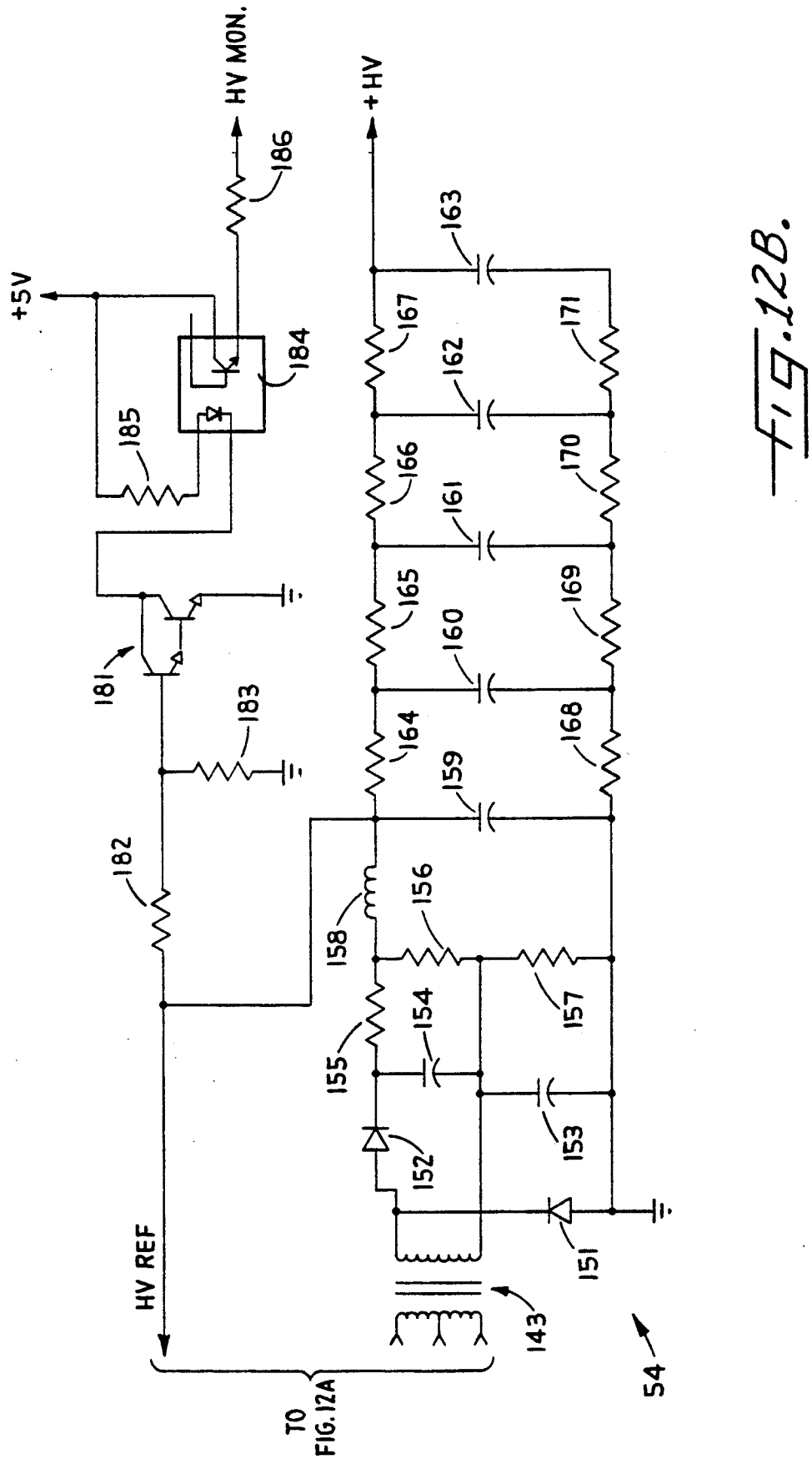

Turning now to FIGS. 12A and 12B, there is shown a schematic diagram of a preferred circuit for the high voltage power supply 54. The power supply uses a pulse-width modulator including an integrated circuit 121, part number CS3525A. The characteristic frequencies of the pulse width modulator are set by resistors 122, 123 and capacitors 124 and 125. These components have values, for example, of 470 ohms for resistor 122, 26.1 K ohms for resistor 123, 1000 picofarads for capacitor 124, and 1000 picofarads for capacitor 125. The integrated circuit 121 also works in connection with an electrolytic capacitor 126 to insure proper starting conditions.

The voltage of the high-voltage power supply is regulated by a feedback loop to a differential amplifier inside the integrated circuit 121. Biasing for the noninverting input of this differential amplifier is provided by resistors 127, 128 and an electrolytic capacitor 129. Typical component values are, for example, 4.99 K ohms for resistor 127, 4.9 K ohms for resistor 128, and 1 microfarad for the capacitor 129. The inverting input of the differential amplifier is connected to a compensation terminal through a network including a resistor 130, a capacitor 131, and an electrolytic capacitor 132. Typical component values are 10 K ohms for resistor 130, 0.1 microfarads for capacitor 131, and 1 microfarad for capacitor 132. To obtain the desired high voltage output level, the analog control voltage on the line 55 from the digital to analog converter (56 in FIG. 10) is connected to the inverting input of the integrated circuit 121 through a variable resistor 133 and a fixed resistor 134, and similarly a high voltage reference signal HV REF is also applied to the input through a resistor 135. Typical component values are, for example 100 K ohms for resistor 133, 10 K ohms for resistor 134, and 20 megohms for the resistor 135. The resistor 133 is adjusted to provide a voltage change of 5 V for each step from the 8-bit digital to analog converter (56 in FIG. 10). In other words, the variable resistor 133 sets the maximum high voltage or range generated by the high voltage power supply.

The microcomputer may turn the high voltage power supply on and off by a HV SHUT DOWN signal applied on a line 136. A resistor 137, for example 10 K ohms, normally holds the line 136 to a logic high to shut off the high voltage power supply.

The integrated circuit 121 controls two power field effect transistors 141 and 142 working in a push-pull configuration to excite a transformer 143. The power applied to the field-effect transistors 141, 142 is limited by a fuse 144. Power supply ripple from the switching action is reduced by electrolytic capacitors 145 and 146 which have values, for example, of 100 microfarads and 470 microfarads, respectively. Power applied to the integrated circuit 121 and to the gates of the field-effect transistors 141, 142 is further limited by resistors 147, 148 and 149. Typical values, for example, are 470 ohms for resistor 147, and 2.2 K ohms for resistors 148 and 149.

Continuing on FIG. 12B, the transformer 143 steps up 12 volts to a maximum of about 700 volts AC which is rectified by a full wave doubler circuit to provide a maximum of about 1,400 volts DC. The full wave doubler includes directional diodes 151, 152 such as part no. VB60, and capacitors 153 and 154 which are, for example, 0.01 microfarad capacitors rated as 1.4 KV. The voltage across these capacitors is stabilized by resistors 155, 156 and 157 which have values, for example, of 1 K ohms, 22 megohms, and 22 megohms, respectively.

The output of the full wave doubler is filtered by a low-pass filter including an inductor 158, capacitors 159-163, and resistors 164-171. The inductor 158, for example, has a value of 100 microhenries, the capacitors have a value of 0.01 microfarad and are rated at 1.4 kilovolts, and the resistors are 68 K ohms.

To monitor whether the high-voltage power supply is turned on, the HV REF signal is applied to a Darlington transistor, such as part no. MPSA13, through a voltage divider including a series resistor 182 and a shunt resistor 183. Typical values for the resistors are 22 megohms and 220 K ohms, for sensing a high voltage in excess of about 100 volts. When the Darlington transistor 181 is turned on, an optical isolator 184 is also turned on to assert a HV MON. signal. The optical isolator 184 works in connection with current limiting resistors 185 and 186 having values, for example, of 330 ohms and 100 ohms, respectively. The optical isolator 184 is, for example, part no. 4N35.

Figure 13:
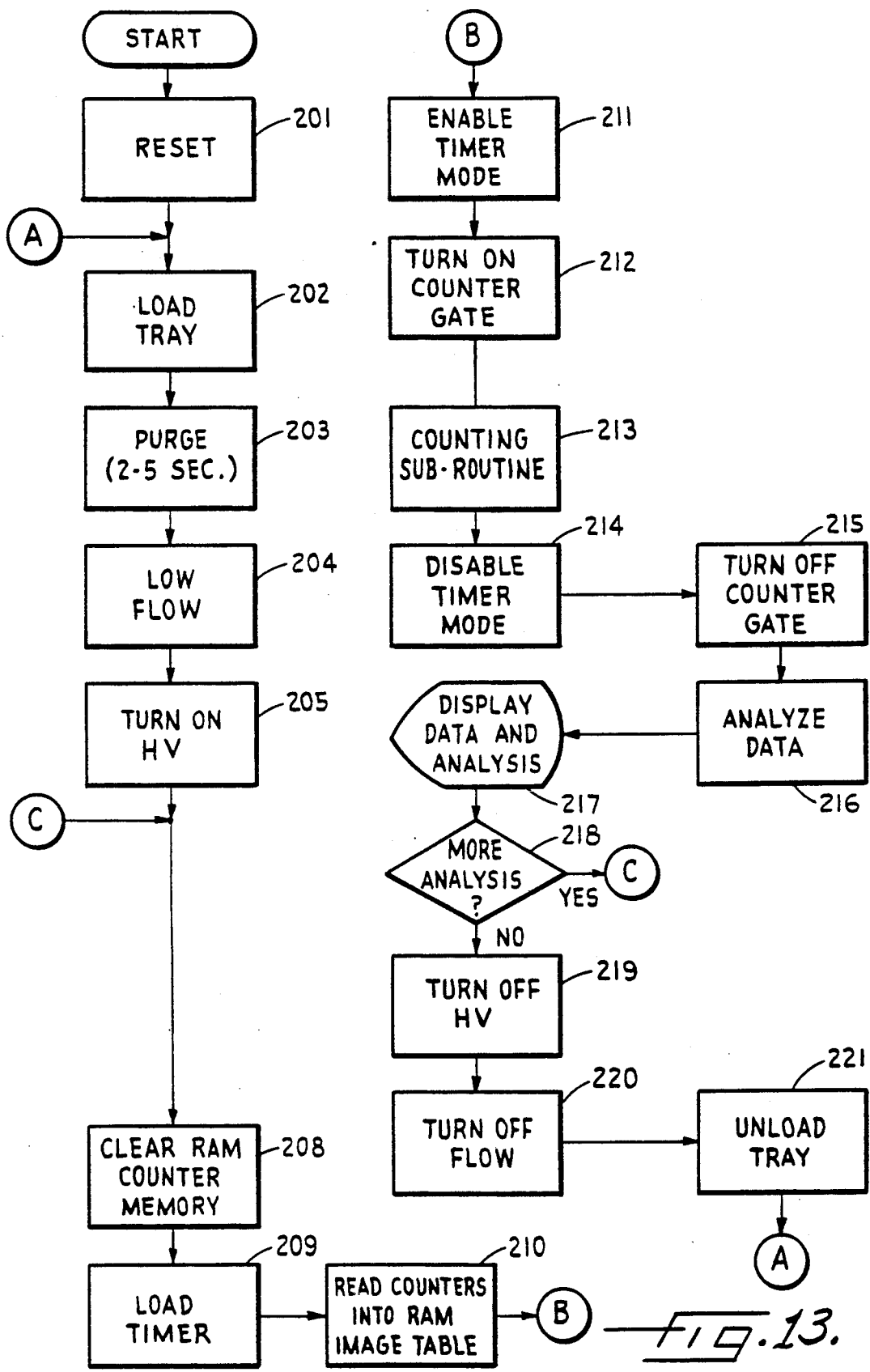
FIG. 13 is a flowchart of the basic steps used to perform a radiometric analysis using the radiometric analysis instrument.

Turning now to FIG. 13, there is shown a flowchart of the basic procedure performed by the microcomputer (41 in FIG. 10) to operate the radiometric analysis instrument (20 in FIG. 1) to read a filter carrier plate or sample tray. In the first step 201, the electrical circuits are reset to initial conditions in which the gas flow is shut off, the high-voltage power supply is shut off, and the counters are disabled from counting. Next, in step 202, the sample tray is loaded into the instrument, and in step 203 the microcomputer asserts the PURGE signal to the flow control (53 in FIG. 10) to purge the Geiger counting chambers for about 2 to 5 seconds. Then in step 204 the microcomputer turns off the PURGE signal and asserts the LOW FLOW signal to conserve the gas supply. In step 205 the microcomputer turns on the high voltage power supply by de-asserting the HV SHUT DOWN signal.

With the high voltage power supply turned on, the clock pulse which initializes the counters (the "LOAD COUNTERS" signal) is generated at step 207, and then the RAM counter memory is cleared at step 208.

In step 208 predefined RAM memory locations serving as respective multi-precision (for example 32-bit) counters for the Geiger counters are cleared. Next in step 209 the programmable timer is loaded with the desired counting time. Then in step 210 the counters (58 in FIG. 10) are read and their values are transferred to respective locations in an image table in RAM.

To start the counting of radiation events, the timer mode is enabled in step 211 and the counter gate is turned on in step 212. Then in step 213 a subroutine is called to accumulate the Geiger counter values in the RAM counters.

At the end of counting, in step 214 the timer mode is disabled and in step 215 the counter gate is turned off. Then in step 216 the data in the RAM counters is analyzed, for example by computing the counts per minute if the counting interval is different from one minute. Next in step 217 the data or analysis is displayed.

In step 218 the operator may select further analysis, for example, by re-counting over a longer counting interval. Otherwise, the analysis is finished. The high voltage supply is turned off in step 219, the gas flow is shut off in step 220, and the sample tray or carrier plate is unloaded in step 221. Then the microcomputer may resume its execution at step 202 to load another sample tray or carrier plate for the next analysis.

Figure 14:
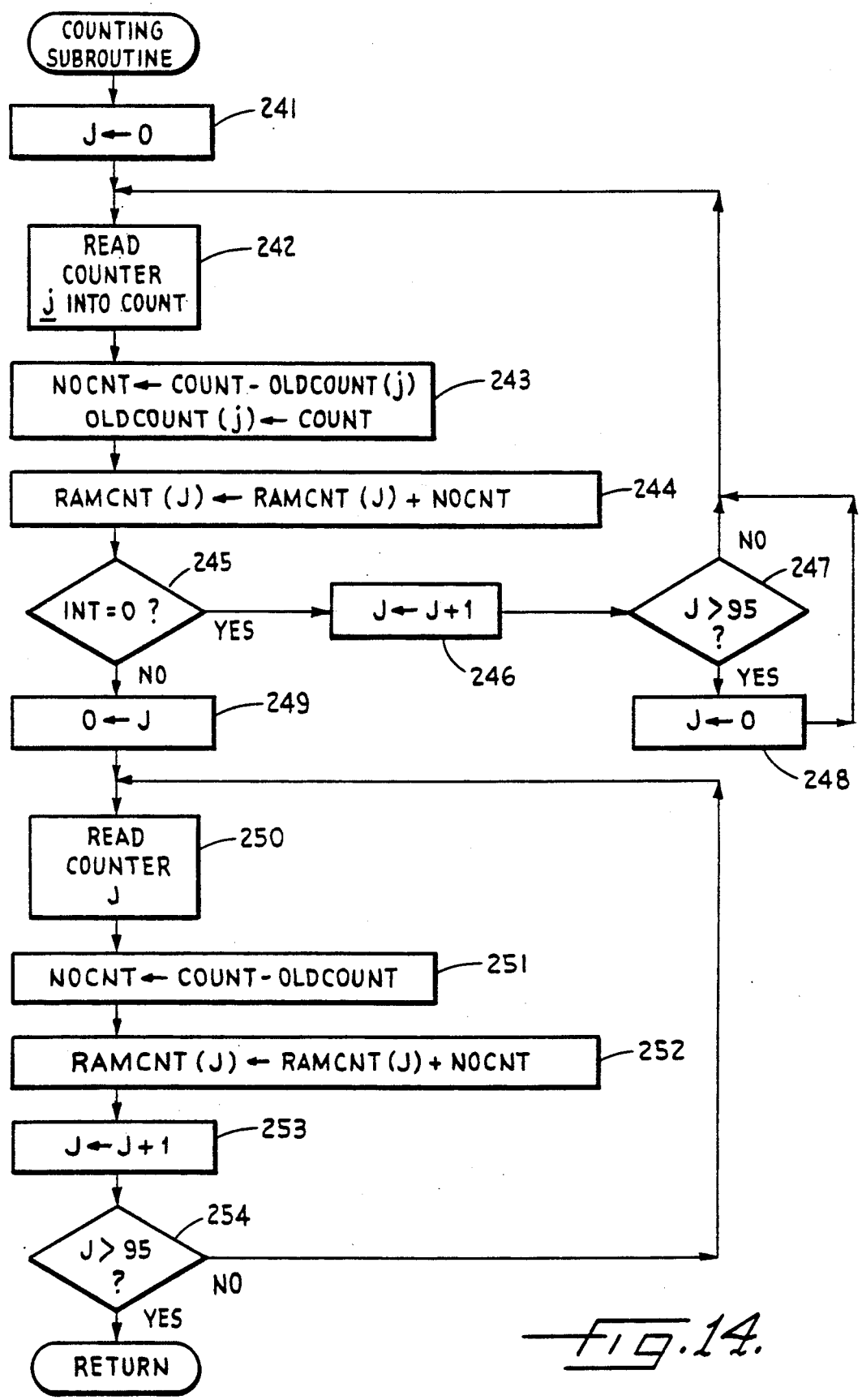
FIG. 14 is a flowchart of a procedure which is used in the radiometric analysis instrument to accumulate counts of radiation events.

Turning now to FIG. 14 there is shown a flowchart of the counting subroutine (that was called in step 213 of FIG. 13) to accumulate the values from the counters 58 into respective RAM counters. This is done to avoid loss of information when the counters 58 overflow or "roll over". In the first step 241 an index j is set to zero. Then in step 242 the jth one of the counters 58 is addressed and its contents are read into a memory location COUNT. In step 243 the difference NOCNT is computed between the number of counts COUNT previously read from the jth counter and the respective value OLDCOUNT(j) obtained from the image table in RAM (which was loaded in step 210 of FIG. 13). Also in step 243 the image table is updated with the number of counts COUNT just read from the jth counter. Next in step 244 the respective element of the RAM counter array RAMCNT(j) is incremented by the value NOCNT. In fact the value in the RAM counter always increases when there is a change in value of its respective counter 58, even though the respective counter 58 "rolls over." In step 245 the INT signal from the timer (59 in FIG. 10) is tested. If the INT signal is low, indicating that the end of the counting interval has not been reached, then the index j is advanced and execution loops back to step 241 repeatedly until the end of the counting interval is reached. In particular, the index j is incremented in step 246 and tested in step 247. If the index has been incremented past its maximum value of 95 it is set to its minimum value of zero in step 248.

It should be apparent that during the counting interval, the radiation events registered in the counters 58 are also counted in the respective RAM counter array RAMCNT. But at the end of the counting interval it is necessary to transfer from the counters 58 to the RAM counters all of the counts registered just prior to sensing of the end of the counting interval. This is done in steps 249 to 254. First in step 249 the index j is set to zero. Then steps 250 to 252 are performed to transfer the counts from the jth counter to its respective RAM counter in a manner similar to steps 242 to 244 described above. The index j is incremented in step 253 and tested in step 254 to determine whether the final transfer has been performed for all 96 of the counters. If the maximum value of 95 has not been exceeded, then execution branches back to step 250. Otherwise, execution returns and the subroutine is finished.

Figure 15:
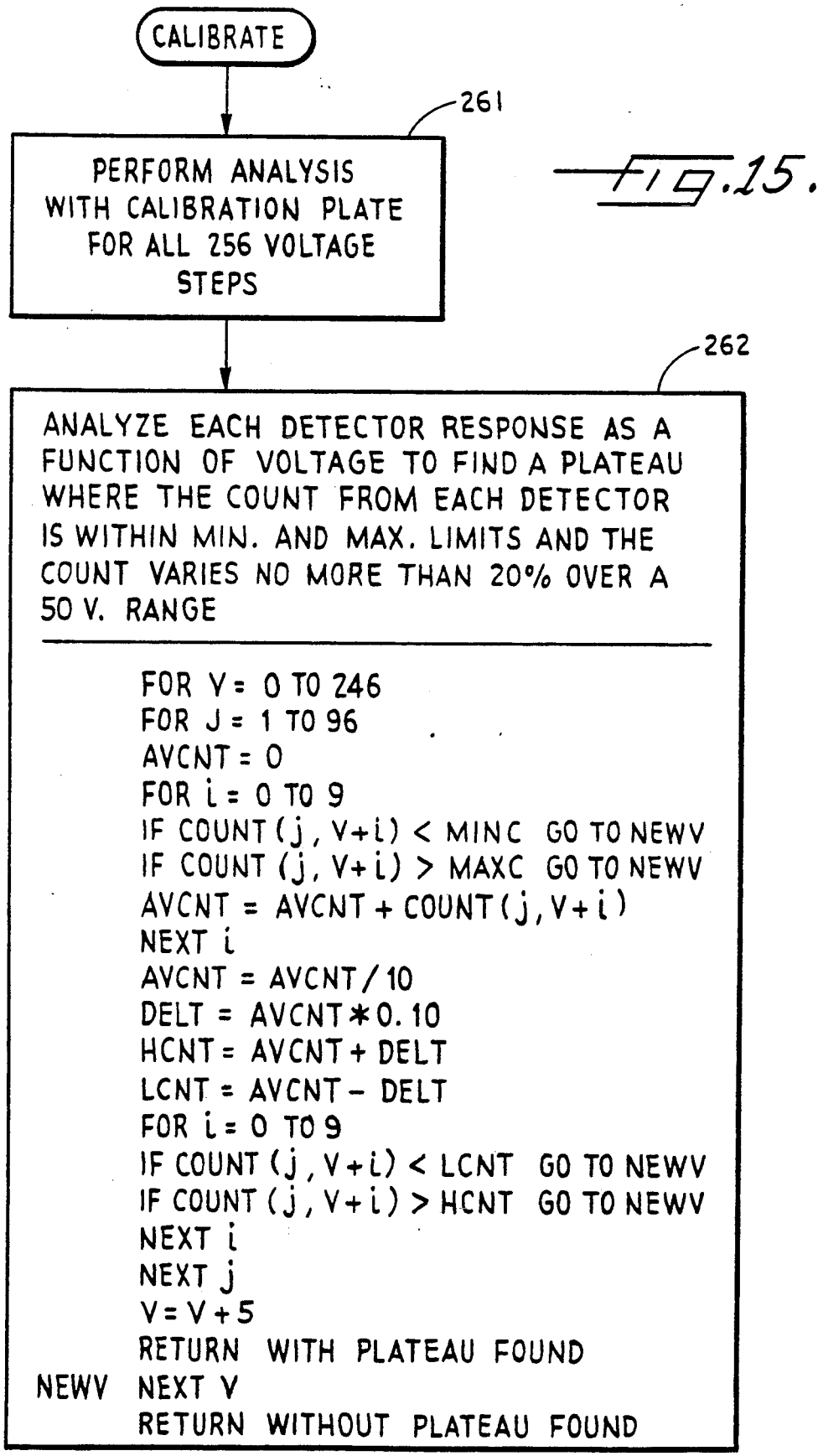
FIG. 15 is a flowchart of a calibration procedure which automatically selects the voltage of the high voltage power supply to operate all of the Geiger counters in the instrument in a Geiger counting mode.

Turning now to FIG. 15, there is shown a flowchart of a calibration procedure for setting the voltage of the high voltage power supply (54 in FIG. 10). In the first step 261 the analysis of FIG. 13 is performed with a uniformly radioactive calibration plate, and for all of the 256 voltage levels. (To speed up the calibration process, the analysis could instead be performed at every other voltage level.) The calibration plate, for example, has a radioactivity of about 5 $\mu$C/gm giving about 1000 counts over a duration of 0.1 second, and the counting interval for the calibration analysis is 0.1 minutes or 6 seconds. Then in step 262 each Geiger counter response as a function of voltage is analyzed to find a plateau where the count from each detector is within predefined minimum and maximum limits and such that the count varies no more than 20% over a 50 volt range. A specific procedure for such an analysis is listed in box 262 of FIG. 15, and the procedure may return with a number V for the voltage +HV in units of 5 volts, or the procedure may return without success indicating that a value of high voltage does not exist that would satisfy the desired conditions. If the procedure returns without success, the instrument would be serviced or repaired.

In view of the above, there has been described a radiometric analysis instrument capable of simultaneously but independently reading the radioactivity of all 96 samples arranged on a support in a standard size array corresponding to the arrangement of samples on a MICROTITER ® plate. A separate Geiger counter is provided for each sample to eliminate the need of a moving scanner and to obtain a reading in a minimum amount of time. The Geiger counters are formed in a metal plate that provides shielding to minimize "cross talk" between adjacent samples.

For sensing low-energy radiation from samples labeled with tritium, the Geiger counters preferably are windowless. Alternatively a sheet of plastic such as MYLAR ® could be secured to the lower surface of the detector plate (23 in FIG. 2) to seal all of the Geiger counters and in effect provide a "window" for each Geiger counter. This could be desirable when the radiometric analysis system is to be used for sensing high-energy radiation such as radiation from samples labeled with radioactive carbon (Isotope 14), sulfur (isotope 35), phosphorous (isotope P32). In this case the plastic sheet would contain the ionizable gas within the Geiger chambers to eliminate the need for purging whenever a new sample plate is introduced, and the plastic sheet would also serve as an energy selective filter to prevent the Geiger counters from detecting low-energy radiation.

We claim:

1. Apparatus for simultaneously measuring the radioactivity of multiple samples arranged in a predetermined array of x rows and y columns on a sample carrier, said apparatus comprising a fixed array of radiation counters arranged in the same array of x rows and y columns as said multiple samples so that one of said counters is aligned with each of said multiple samples, each of said counters comprising a windowless cavity which is open at one end for receiving radiation from a sample to be measured, a pair of spaced electrodes and inlet and exit means for passing an ionizable gas through the space between said electrodes, said fixed array of radiation counters being adapted to fit against said sample carrier so that said carrier closes the open ends of said cavities with each sample located within the projected side walls of one of said cavities, an electrical voltage source connected to said electrodes for applying a substantially uniform voltage across the electrodes of each of the radiation counters in said array, means for maintaining a substantially uniform flow of said ionizable gas through each of the radiation counters in said array, and sensing means connected to the electrodes of each of said radiation counters for independently detecting pulses of electrical current produced by ionization of the gas flowing between the respective pairs of electrodes of each of said radiation counters, said sensing means including means for simultaneously but independently detecting and counting pulses from all of said radiation counters.

2. The apparatus of claim 1 wherein all said radiation counters are formed in a single metal plate, the side walls of said cavity form one of the electrodes for the counter, and a conductive pin extends into the opposite end of the cavity to form the other electrode for the counter.

3. The apparatus of claim 1 wherein all said radiation counters are formed in a single metal plate, the open ends of all the cavities are located on a common surface of the plate so that the plate can be placed over a coplanar array of radioactive samples to be measured, said samples and said counter cavities having the same center-to-center spacing of said x rows and y columns so that the samples and the cavities register with each other when the plate is placed over the sample array.

4. The apparatus of claim 1 which includes a gas manifold for supplying said ionizable gas to all said counters at a substantially uniform pressure and flow rate so that all the counters produce substantially the same measurement for a given radioactivity level.

5. The apparatus of claim 4 wherein said exit means of each counter is located at an end of the counter which receives the radiation from the samples, said inlet means of each counter is located at an opposite end of the counter, and said gas manifold includes means for supplying gas to the inlet means of each counter.

6. The apparatus of claim 5 wherein all said radiation counters are formed in a single metal plate, and said gas manifold is formed in a second plate.

7. The apparatus of claim 4 wherein all said radiation counters are formed in a single metal plate, and said gas manifold is formed in a second plate.

8. The apparatus of claim 7 which includes a printed circuit board mounted to one side of said metal plate for connecting one of the electrodes of each of said radiation counters to said sensing means, and said gas manifold plate is mounted on the opposite side of said printed circuit board from said metal plate, said printed circuit board forming apertures for transmitting said ionizable gas from said manifold plate to said metal plate.

9. Apparatus for simultaneously measuring the radioactivity of multiple samples arranged in a predetermined array of x rows and y columns on a sample carrier, said apparatus comprising a fixed array of radiation counters arranged in the same array of x rows and y columns as said multiple samples so that one of said counters is aligned with each of said multiple samples, each of said counters comprising a windowless cavity which is open at one end for receiving radiation from a sample to be measured, a pair of spaced electrodes in a chamber filled with an ionizable gas, said counters being formed in a metal plate, each counter comprising a cavity in said metal plate which is open at one end for receiving radiation from a sample to be measured, the side walls of said metal plate forming said cavity providing one of the electrodes for the counter, and a conductive pin extending into an opposite end of the cavity to form the other electrode for the counter, said fixed array of radiation counters being adapted to fit against said sample carrier so that said carrier closes the open ends of said cavities with each sample located within the projected side walls of one of said cavities, an electrical voltage source connected to said electrodes for applying a substantially uniform voltage across the electrodes of each of the radiation counters in said array, and sensing means connected to the conductive pin electrode of each of said radiation counters for independently detecting pulses of electrical current produced by ionization of the gas between the respective pairs of electrodes of each of said radiation counters, said sensing means including means for simultaneously but independently detecting and counting pulses from all of said radiation counters.

10. The apparatus of claim 9 wherein the ends of all the cavities for receiving radiation being located on a common surface of the plate so that the plate can be placed over a coplanar array of radioactive samples to be measured, said samples and said counter cavities having the same center-to-center spacing of said X rows and y columns so that the samples and the cavities register with each other when the plate is placed over the sample array.

11. The apparatus of claim 10 further comprising a printed circuit board fastened to a side of said plate at said opposite ends of said cavities, said conductive pins being mounted to and extending from said printed circuit board.

12. The apparatus of claim 11 further comprising a respective detector circuit mounted on said printed circuit board for each of said conductive pins.

13. Apparatus for simultaneously measuring the radioactivity of multiple samples arranged in a predetermined array of 8 rows and 12 columns on a sample carrier, said apparatus comprising a fixed array of Geiger counters arranged in the same array of 8 rows and 12 columns as said multiple samples so that one of said counters is aligned with each of said multiple samples, each of said counters comprising a windowless cavity which is open at one end for receiving radiation from a sample to be measured, having a pair of spaced electrodes in a chamber filled with an ionizable gas, said counters being formed in a metal plate, each counter comprising a cavity which is open at one end for receiving radiation from a sample to be measured, the side walls of said cavity including one of the electrodes for the counter, and a conductive pin extending into an opposite end of the cavity to form the other electrode for the counter, an electrical voltage source connected to said electrodes for applying a substantially uniform voltage across the electrodes of each of the geiger counters in said array, and sensing means connected to the conductive pin electrode of each of said Geiger counters for independently detecting pulses of electrical current produced by ionization of the gas between the respective pairs of electrodes of each of said Geiger counters, said sensing means including means for simultaneously but independently detecting and counting pulses from all of said radiation counters wherein the ends of the cavities for receiving radiation are located on a common surface of the plate so that the plate can be fit against a coplanar array of radioactive samples to be measured, said samples and said counter cavities having the same center-to-center spacing of said 8 rows and 12 columns so that the samples and the cavities register with each other when the plate is placed over the sample array.

14. The apparatus of claim 13 further comprising a printed circuit board fastened to a side of said plate at said opposite ends of said cavities, said conductive pins being mounted to and extending from said printed circuit board.

15. The apparatus of claim 14 further comprising a respective detector circuit mounted on said printed circuit board for each of said conductive pins.

16. A method of simultaneously measuring the radioactivity of multiple samples arranged in a predetermined array of x rows and y columns on a sample carrier, said method comprising engaging said sample carrier with a fixed array of radiation counters comprising a windowless cavity which is open at one end for receiving radiation from a sample to be measured, a pair of spaced electrodes and inlet and exit means for passing an ionizable gas through the space between said electrodes, said counters being arranged in the same array of x rows and y columns as said multiple samples so that one of said counters is aligned with each of said multiple samples, and said carrier closes the open ends of said cavities with each sample located within the projected side walls of the corresponding cavity, applying a substantially uniform electrical voltage across the electrodes of each of the radiation counters in said array, maintaining a substantially uniform flow of ionizable gas through each of the radiation counters in said array, and independently and concurrently detecting and counting pulses of electrical current produced by ionization of the gas flowing between the respective pairs of electrodes of all of said radiation counters.

17. The method of claim 16 wherein said ionizable gas is predominantly helium.

* * * * *